United States Patent
Bradley et al.

(10) Patent No.: US 9,613,318 B2
(45) Date of Patent: *Apr. 4, 2017

(54) INTELLIGENT USER INTERACTION EXPERIENCE FOR MOBILE COMPUTING DEVICES

(71) Applicant: International Business Machines Corporation, Armonk, NY (US)

(72) Inventors: Lisa M. Bradley, Cary, NC (US); Matthew E. Broomhall, Goffstown, NH (US); Robert E. Loredo, North Miami Beach, FL (US); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 95 days.

This patent is subject to a terminal disclaimer.

(21) Appl. No.: 14/624,562

(22) Filed: Feb. 17, 2015

(65) Prior Publication Data
US 2016/0239741 A1 Aug. 18, 2016

(51) Int. Cl.
*G06N 99/00* (2010.01)
*G06N 5/04* (2006.01)

(52) U.S. Cl.
CPC ............. *G06N 99/005* (2013.01); *G06N 5/04* (2013.01)

(58) Field of Classification Search
CPC G06N 5/04; G06N 5/02; G06N 5/022; G06N 99/005
USPC .......................................................... 706/11
See application file for complete search history.

(56) References Cited

U.S. PATENT DOCUMENTS

| | | | |
|---|---|---|---|
| 7,698,302 B2 | 4/2010 | Wendelrup | |
| 8,244,814 B1 | 8/2012 | Brown et al. | |
| 2004/0003391 A1 | 1/2004 | Gutta et al. | |
| 2008/0091722 A1 | 4/2008 | Wendelrup | |
| 2008/0139112 A1* | 6/2008 | Sampath | G06F 17/30867 455/3.04 |

(Continued)

OTHER PUBLICATIONS

Lemlouma T et al., "Adapted Content Delivery for Different Contexts", Proceedings of the 2003 Symposium on Applications and the Internet (SAINT'03), 2003.*

(Continued)

*Primary Examiner* — Dave Misir
(74) *Attorney, Agent, or Firm* — North Shore Patents, P.C.; Lesley A. Leonessa

(57) ABSTRACT

A system for assessing a user interaction experience of content displayed on a mobile device, implemented by a computing processor, receives an indication of content to be displayed on the mobile device. The indication is received in response to a user attempting to access the content. The system analyzes the content to assess the user interaction experience of the content to be displayed on the mobile device. The analysis is based at least on the mobile device on which the content is to be displayed. The user interaction experience is comprised of the viewing quality of the content to be displayed on the mobile device, and/or a feasibility of user interaction with the content. Based on the user interaction experience, the system presents, on the mobile device on which the content is to be displayed, an indication of the user interaction experience and the indication of the content to be displayed on the mobile device.

11 Claims, 2 Drawing Sheets

(56) References Cited

U.S. PATENT DOCUMENTS

| | | |
|---|---|---|
| 2010/0015956 A1* | 1/2010 | Qu .................. H04N 7/163 455/414.1 |
| 2010/0169153 A1 | 7/2010 | Hwacinski et al. |
| 2010/0281152 A1* | 11/2010 | Istavan ............ H04N 21/2355 709/223 |
| 2011/0093337 A1 | 4/2011 | Granit et al. |
| 2011/0282964 A1* | 11/2011 | Krishnaswamy ...... G06Q 30/02 709/217 |
| 2012/0303568 A1 | 11/2012 | Michel et al. |
| 2013/0124656 A1 | 5/2013 | Peng |
| 2013/0235073 A1* | 9/2013 | Jaramillo ................ G09G 5/00 345/619 |
| 2014/0171039 A1* | 6/2014 | Bjontegard ....... H04L 29/06034 455/414.1 |
| 2014/0244734 A1* | 8/2014 | Nutt ...................... G06Q 10/10 709/203 |
| 2015/0089424 A1* | 3/2015 | Duffield ................ G06F 3/0484 715/771 |
| 2015/0262208 A1* | 9/2015 | Bjontegard ........ G06Q 30/0202 705/7.31 |

OTHER PUBLICATIONS

Reynolds, Adapting Content, Pervasive Computing, IEEE (vol. 7, Issue: 4), http://ieeexplore.ieee.org/xpl/articleDetails.jsp?tp=&arnumber=4653463&queryText%3Drecommended+viewing+email+content+mobile+device, Dec. 2008.

Content Optimization for Mobile Devices, http://developer.att.com/application-resource-optimizer/docs/best-practices/content-optimization-for-mobile-devices.

Singh, Mobile Recommendation Engine, https://priorart.ip.com/IPCOM/000169161, Apr. 8, 2008.

* cited by examiner

INTELLIGENT USER INTERACTION EXPERIENCE FOR MOBILE COMPUTING DEVICES

BACKGROUND

Mobile devices are used to access different types of content, such as emails and websites. Some emails and websites are easily viewed on mobile devices, smart phones, tablets, etc. Other content, such as large emails, emails with attachments, websites with large diagrams, forms that require input data, social media websites, etc., may be difficult to view on a mobile device. Therefore, it would be beneficial for users to receive a recommendation that assesses the user's experience interacting with the content, prior to accessing the content, allowing the user to decide whether to continue to access the content.

SUMMARY

According to an embodiment disclosed herein, in a method for identifying viewing quality of content displayed on a mobile device, the method receives an indication of content to be displayed on the mobile device, where the indication is received in response to a user attempting to access the content on the mobile device. The method analyzes the content to assess the user interaction experience of the content to be displayed on the mobile device. The analysis is based at least on the mobile device on which the content is to be displayed. The user interaction experience is comprised of at least one of the viewing quality of the content to be displayed on the mobile device, and a feasibility of user interaction with the content. Based on the user interaction experience, the method presents on the mobile device on which the content is to be displayed, an indication of the user interaction experience and the indication of the content to be displayed on the mobile device. The method allows the user to determine whether to access the content. The method detects an action by the user, wherein the action indicates whether the user accessed the content. Based on the action by the user, the method learns user preferences associated with viewing the content on the mobile device, and incorporates the user preferences into the analysis of the content.

System and computer program products corresponding to the above-summarized methods are also described and claimed herein.

DETAILED DESCRIPTION

Figure 1:
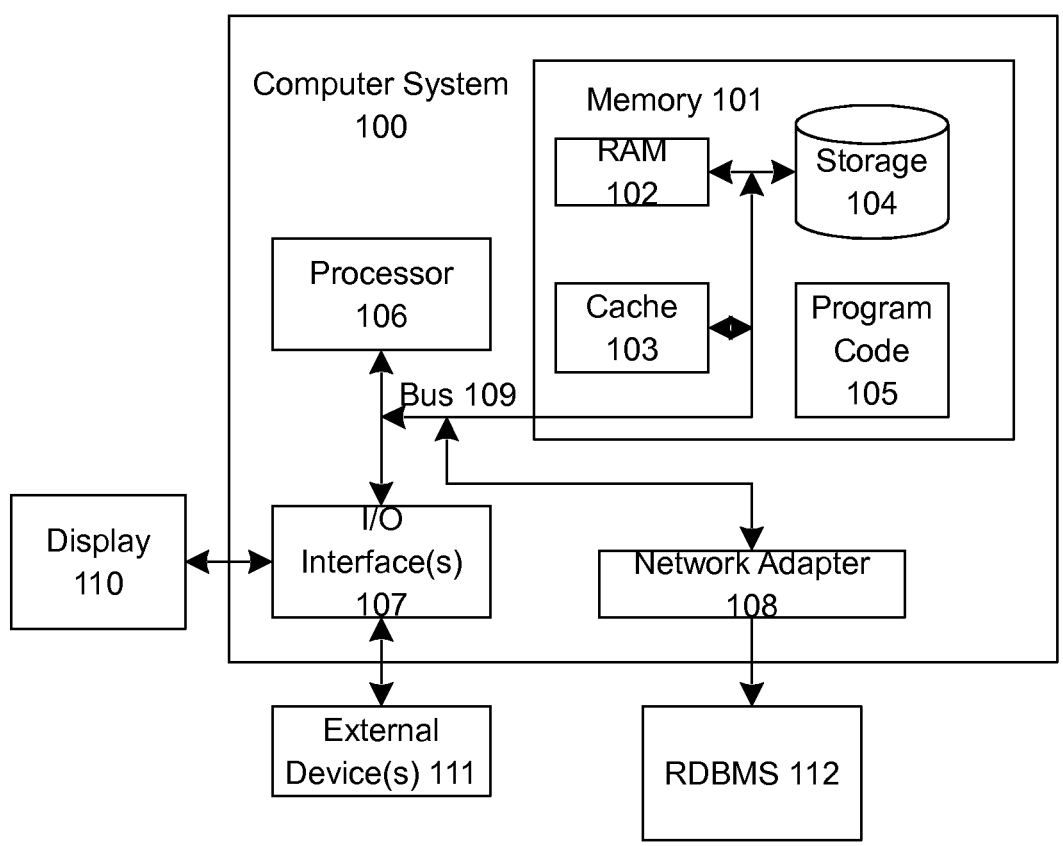
FIG. 1 illustrates an embodiment of a system for assessing a user interaction experience of content displayed on a mobile device, according to embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates a system for assessing a user interaction experience of content displayed on a mobile device, according to embodiments of the present invention. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The computer system 100 may also communicate with one or more external devices 111, such as a display 110, via I/O interfaces 107. The computer system 100 may communicate with one or more networks via network adapter 108. The computer system 100 may communicate with one or more databases 112 via network adapter 108.

Figure 2:
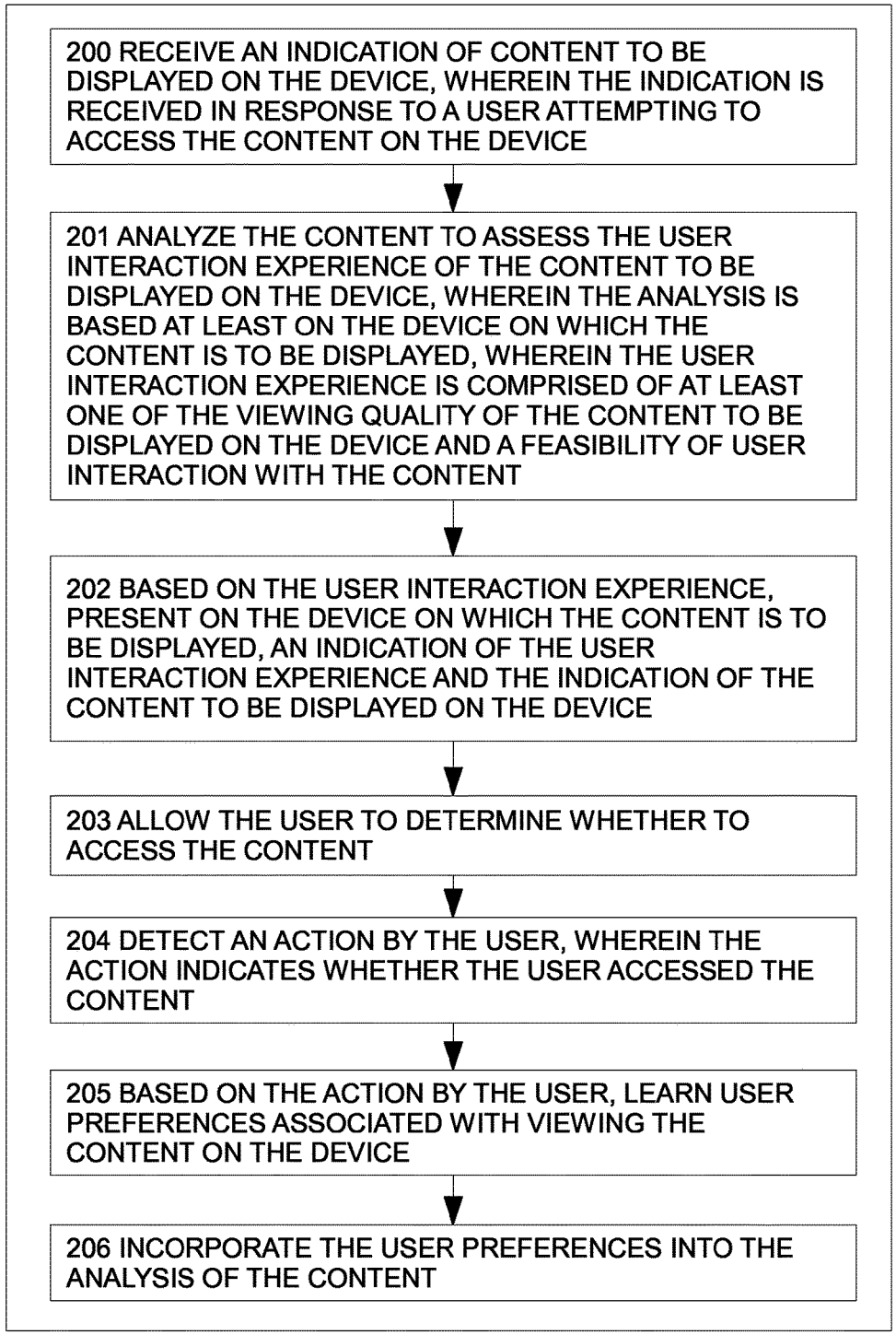
FIG. 2 is a flowchart illustrating an embodiment of a method for assessing the user interaction experience of content displayed on a mobile device, according to embodiments disclosed herein.

FIG. 2 illustrates an embodiment of a method for assessing a user interaction experience of content displayed on a mobile device. At 200, the method, via the computing processor 106, receives an indication of content to be displayed on the mobile device, where the indication is received in response to a user attempting to access the content on the mobile device. For example, a user may receive an indication of incoming email, try to access email, try to access a web page, open a file, download an application, or access an application using a mobile device.

At 201, the method analyzes the content to assess the user interaction experience of the content to be displayed on the mobile device. The user interaction experience is comprised of at least one of the viewing quality of the content to be displayed on the mobile device and a feasibility of user interaction with the content. The analysis is based at least on the mobile device on which the content is to be displayed. The method assists the user in determining whether to access content on that particular mobile device. For example, when a user attempts to access email or a web page on their mobile device, the method analyzes that email or web page to assess whether the user will have a good experience viewing that email or web page on that particular mobile device. The user's experience is based on at least the viewing quality of that email or web page on that mobile device and/or whether the user will be able to interact with the email or web page on that mobile device. The user's experience interacting with the email or website may be frustrating, due to the viewing quality of the content, or the feasibility of the user interacting with the content. For example, a long email that will require the user to scroll through several pages, and display only a few lines at a time on the screen may result in a frustrating experience. An email with a large attachment may be difficult to view on a mobile device. A user may also become frustrated if the user can only view a portion of an image on a screen, or if a user tries to fill out a form on a web page. Radio buttons on a web page may also be difficult to select on a mobile device. In another example embodiment, the method may user text analysis to analyze the content. For example, content that contains code may be difficult to view on a mobile device, or content that requires concentration may be inadvisable to view when a user is in motion, or traveling. In yet another example embodiment, the method may take into account the usability of a mobile device, in addition to the user interaction experience of the content, when a user attempts to download and/or access an application on the mobile device.

At 202, based on the user interaction experience, the method presents, on the mobile device on which the content is to be displayed, an indication of the user interaction experience and the indication of the content to be displayed on the mobile device. For example, if a user attempts to access an email, the method provides an indication of the viewing quality of that email, along with an indication that the email is available for the user. In an example embodiment, the method may present two indications assessing an email and the email's attachment separately, or the method may present an indication that represents an aggregated assessment of the email and the email's attachment.

At 203, the method allows the user to determine whether to access the content. The method may present a recommendation, for example, that an email is too large to easily view on a mobile device. The method allows the user to determine whether to or not to access that email. In other words, the user may override the assessment of the user interaction experience.

At 204, the method detects an action by the user, where the action indicates whether the user accessed the content. In an example embodiment, when the user attempts to access content on a mobile device, the method analyzes the content to determine the user interaction experience, and provides the user with an assessment of that user interaction experience. The user may choose whether to access the content. If the user accesses the content, the method detects that action by the user.

At 205, based on the action by the user, the method learns user preferences associated with viewing the content on the mobile device. In an example embodiment, based on the user's decision whether to access the content after the method provides the user interaction experience, the method learns the users preferences. The method may learn the user preferences based on, for example, how quickly a user exits an email, web page or application, or based on how long the user view and/or interacts with the content. For example, a user might use their tablet when they are not home. The user may choose not to access large emails when using their tablet to avoid using their cell data plan even though the method may provide a positive user interaction experience assessment for large emails on that particular mobile device. When the user chooses not to access the content despite a positive user interaction experience assessment, the method learns the users preferences (in this case, that the user chooses not to access large emails when using a cell data plan). In another example embodiment, the method may take into account the usability of a mobile device, in addition to the user interaction experience of the content and user preferences, when a user attempts to download and/or access an application on the mobile device. In yet another example embodiment, the method may provide the user with the ability to provide the user interaction experience assessment. For example, the user might mark an email as "not viewable" to assist the method in analyzing the content, and/or in learning user preferences At 206, the method incorporates the user preferences into the analysis of the content. For example, referring to the previous example at 205, the method learns the user preferences, and incorporates the user preferences into the assessment. Here, despite the positive user interaction experience assessment for a large email on a tablet, the method incorporates the user preferences into the assessment and provides an assessment recommending the user not access the large email on the tablet. The user may choose whether or not to access the large email, regardless of the user interaction experience assessment.

In an example embodiment, when the method incorporates the user preferences into the analysis of the content, the method iteratively incorporates the action by the user into the analysis of the content. The method refines the assessment of the user interaction experience as the user continues to interact with the assessments and the mobile device. In other words, the method learns the user's behavior over time. For example, if a user repeatedly closes out of a form that requires input, the method determines that the user does not want to view form content on the mobile device. The method may make this determination after the user closes out of the form a specific number of times. The method may also make this determination based on the user's behavior with regard to long emails, emails with attachments, web pages that have input controls, such as radio buttons, etc. For example, the method may determine that the user avoids input fields, but not radio buttons, etc., and incorporates those user preferences into the assessment of the user interaction experience.

In an example embodiment, when the method analyzes the content to assess the user interaction experience of the content to be displayed on the mobile device, the method obtains user preferences, specified by the user, where the user preferences are incorporated into the analysis of the content. The method may learn the user preferences through the user's actions, and the user may also specify the user preferences. In an example embodiment, the user may input their preferences. The user may specify that he/she does not wish to fill out forms on the mobile device, view web pages that contain radio buttons, view content that requires scrolling the screen more than a specified number of times, view emails over a specified size, and/or view attachments over a specified size, for example. The user may specify whether he/she desires the option of choosing to download emails with attachments, or to be notified that an email has an associated attachment (that was not downloaded on the mobile device). In another example embodiment, the method may assess the user interaction experience as a percentage, for example, the user interaction experience may be 80%. The user may specify that he/she does not wish to view content that is below, for example an assessment of 85%.

In an example embodiment, when the method obtains the user preferences, the method obtains a threshold set by the user, wherein the threshold indicates, based on the user interaction experience of the content, whether the user will access the content on the mobile device. For example, a user may decide not to access content on the mobile device if an email is larger than a particular size, if the email has an attachment, if a web page has input fields or radio buttons, etc. The user may specify what that threshold is.

In an example embodiment, when, based on the user interaction experience, the method presents on the mobile device on which the content is to be displayed, the indication of the user interaction experience and the indication of the content to be displayed, the method presents the indication of the user interaction experience of the content as at least one of a Boolean value, a percentage value, and a graphic representing a user interaction experience value or indicator. For example, when a user attempts to access an email, the method may render a Boolean value next to the email (such as "recommended" or "not recommended"), a percentage value that indicates the user interaction experience assessment, or a graphic, such as a pie chart indicating the user interaction experience assessment. In an example embodiment, the graphic may be a symbol that is color-coded based on the assessment of the user interaction experience. Or, the content itself (for example individual emails) may be color-coded based on the user interaction experience assessment. In yet another example embodiment, based on the assessment of the user interaction experience, the method may arrange content, such as sorting a list of emails based on the assessment. Those emails that received a negative user interaction experience assessment may be displayed at the bottom of the email list.

In an example embodiment, when, based on the user interaction experience, the method presents on the mobile device on which the content is to be displayed, the indication of the user interaction experience and the indication of the content to be displayed, the method determines that the content to be displayed is comprised of a plurality of sub content. For each of the sub content, the method analyzes the sub content to assess the user interaction experience of the sub content when displayed on the mobile device, where the analysis is based at least on the mobile device on which the sub content is to be displayed. Then, based on the user interaction experience, the method presents, on the mobile device on which the sub content is to be displayed, the indication of the user interaction experience of the sub content and the indication of the sub content to be displayed on the mobile device. For example, if a web page has several input controls, such as input fields, radio buttons, etc., the method analyzes each element and provides an assessment for the user interaction experience. In an example embodiment, the method assesses the user interaction experience for activity streams, for example, on a social media website. The method may provide the user interaction experience assessment for each activity in the activity stream, or for the whole activity stream. The method may provide a user interaction experience assessment on the web page itself, or as an overlay, or the user interaction experience assessment may be a plugin for the browser.

In an example embodiment, when the method presents on the mobile device on which the content is to be displayed, the indication of the user interaction experience assessment and the indication of the content to be displayed, the method determines, based on at least one of the user interaction experience and user preferences, that the content will not be presented on the mobile device. Based on the assessment of the user interaction experience and/or the user preferences, the method may decide not to display the content to the user. The method may display an email on the mobile device, but not display the attachment associated with that email. In another example embodiment, the method may not display both the email and the attachment (based on the user interaction experience and/or user preferences of the email and/or the attachment).

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for assessing a user interaction experience of content displayed on a mobile device, the computer program product comprising:
   a computer readable storage medium having computer readable program code embodied therewith, the program code executable by a computing processor to:
   receive, by the processor, an indication of content to be displayed on the mobile device, wherein the indication is received in response to a user attempting to access the content on the mobile device;
   analyze, by the processor, the content to assess the user interaction experience of the content to be displayed on the mobile device, wherein the analysis is based at least on the mobile device on which the content is to be displayed, wherein the user interaction experience is comprised of at least one of viewing quality of the content to be displayed on the mobile device and a feasibility of the user interaction with the content, and wherein the user interaction experience is assessed to provide a recommendation to the user whether to access the content on the mobile device; and
   based on the user interaction experience, present, by the processor, on the mobile device on which the content is to be displayed, an indication of the assessed user interaction experience and the indication of the content to be displayed on the mobile device, wherein the indication of the assessed user interaction experience indicates whether the user will be able to interact with the content on the mobile device, and wherein the indication of the assessed user interaction experience is provided as the recommendation.

2. The computer program product of claim 1 further configured to:
   allow, by the processor, the user to determine whether to access the content.

3. The computer program product of claim 2 further configured to:
   detect, by the processor, an action by the user, wherein the action indicates whether the user accessed the content;
   based on the action by the user, learn, by the processor, user preferences associated with viewing the content on the mobile device; and
   incorporate, by the processor, the user preferences into the analysis of the content.

4. The computer program product of claim 1 wherein the computer readable program code configured to analyze the content to assess the user interaction experience of the content to be displayed on the mobile device is further configured to:
   obtain user preferences, specified by the user, wherein the user preferences are incorporated into the analysis of the content.

5. The computer program product of claim 4 wherein the computer readable program code configured to obtain the user preferences, specified by the user is further configured to:
   obtain a threshold set by the user, wherein the threshold indicates, based on the user interaction experience of the content, whether the user will access the content on the mobile device.

6. The computer program product of claim 1 wherein the computer readable program code configured to, based on the user interaction experience, present, by the processor, on the mobile device on which the content is to be displayed, the indication of the user interaction experience and the indication of the content to be displayed on the mobile device is further configured to:
   present the indication of the user interaction experience of the content as at least one of:
   a. a Boolean value;
   b. a percentage value; and
   c. a graphic representing a user interaction experience value.

7. The computer program product of claim 1 wherein the computer readable program code configured to, based on the user interaction experience, present, by the processor, on the mobile device on which the content is to be displayed, the indication of the user interaction experience and the indication of the content to be displayed on the mobile device is further configured to:
  determine that the content to be displayed is comprised of a plurality of sub content; and
  for each of the sub content:
    analyze the sub content to assess the user interaction experience of the sub content when displayed on the mobile device, wherein the analysis is based at least on the mobile device on which the sub content is to be displayed; and
    based on the user interaction experience, present, on the mobile device on which the sub content is to be displayed, the indication of the assessed user interaction experience of the sub content and the indication of the sub content to be displayed on the mobile device.

8. A system comprising:
a computing processor; and
a computer readable storage medium operationally coupled to the processor, the computer readable storage medium having computer readable program code embodied therewith to be executed by the computing processor, the computer readable program code configured to:
receive, by the processor, an indication of content to be displayed on a mobile device, wherein the indication is received in response to a user attempting to access the content on the mobile device;
analyze, by the processor, the content to assess a user interaction experience of the content to be displayed on the mobile device, wherein the analysis is based at least on the mobile device on which the content is to be displayed, wherein the user interaction experience is comprised of at least one of viewing quality of the content to be displayed on the mobile device and a feasibility of the user interaction with the content, and wherein the user interaction experience is assessed to provide a recommendation to the user whether to access the content on the mobile device; and
based on the user interaction experience, present, by the processor, on the mobile device on which the content is to be displayed, an indication of the assessed user interaction experience and the indication of the content to be displayed on the mobile device, wherein the indication of the assessed user interaction experience indicates whether the user will be able to interact with the content on the mobile device, and wherein the indication of the assessed user interaction experience is provided as the recommendation.

9. The system of claim 8 further configured to:
allow, by the processor, the user to determine whether to access the content;
detect, by the processor, an action by the user, wherein the action indicates whether the user accessed the content;
based on the action by the user, learn, by the processor, user preferences associated with viewing the content on the mobile device; and
incorporate, by the processor, the user preferences into the analysis of the content.

10. The system of claim 8 wherein the computer readable program code configured to, based on the user interaction experience, present, by the processor, on the mobile device on which the content is to be displayed, the indication of the user interaction experience and the indication of the content to be displayed on the mobile device further configured to:
  present the indication of the user interaction experience of the content as at least one of:
  a. a Boolean value;
  b. a percentage value; and
  c. a graphic representing a user interaction experience value.

11. The system of claim 8 wherein the computer readable program code configured to, based on the user interaction experience, present, by the processor, on the mobile device on which the content is to be displayed, the indication of the user interaction experience and the indication of the content to be displayed on the mobile device further configured to:
  determine that the content to be displayed is comprised of a plurality of sub content; and
  for each of the sub content:
    analyze the sub content to assess the user interaction experience of the sub content when displayed on the mobile device, wherein the analysis is based at least on the mobile device on which the sub content is to be displayed; and
    based on the user interaction experience, present, on the mobile device on which the sub content is to be displayed, the indication of the assessed user interaction experience of the sub content and the indication of the sub content to be displayed on the mobile device.

* * * * *